United States Patent
Lai et al.

(10) Patent No.: US 9,386,132 B2
(45) Date of Patent: Jul. 5, 2016

(54) WIRELESS COMMUNICATION DEVICE

(71) Applicant: Chiun Mai Communication Systems, Inc., New Taipei (TW)

(72) Inventors: Chih-Hung Lai, New Taipei (TW); Ting-Chih Tseng, New Taipei (TW); Yen-Hui Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 310 days.

(21) Appl. No.: 14/061,281

(22) Filed: Oct. 23, 2013

(65) Prior Publication Data

US 2014/0302890 A1     Oct. 9, 2014

(30) Foreign Application Priority Data

Apr. 8, 2013  (TW) .............................. 102112271 A

(51) Int. Cl.
*H04M 1/02*       (2006.01)
(52) U.S. Cl.
CPC ............ *H04M 1/026* (2013.01); *H04M 1/0266* (2013.01)
(58) Field of Classification Search
CPC .............................. H01Q 1/3291; H01Q 1/243
USPC .................................................. 343/700, 702
See application file for complete search history.

(56) References Cited

U.S. PATENT DOCUMENTS

| 7,623,079 B2* | 11/2009 | Hayashi | ............... | H01Q 1/3291 |
| | | | | 343/700 MS |
| 2010/0328182 A1 | 12/2010 | Wong | | |
| 2011/0254741 A1* | 10/2011 | Ishimiya | ................ | H01Q 1/243 |
| | | | | 343/702 |

FOREIGN PATENT DOCUMENTS

| JP | 2012039466 A | 2/2012 |
| JP | 2012222701 A | 11/2012 |

\* cited by examiner

*Primary Examiner* — Lester Kincaid
*Assistant Examiner* — Gary Lafontant
(74) *Attorney, Agent, or Firm* — ScienBiziP, P.C.

(57) ABSTRACT

A wireless communication device includes a base board, a display module, and a metal member. The display module is located on the base board. The metal member includes a frame and a metal body. The frame surrounds the display module. The metal body extends from the frame, and is spaced from the display module to reduce electromagnetic interference between the at least one metal body and the display module.

8 Claims, 5 Drawing Sheets

WIRELESS COMMUNICATION DEVICE

BACKGROUND

1. Technical Field

The disclosure generally relates to wireless communication devices, and particularly to a wireless communication device having a better radiating capability.

2. Description of Related Art

Antennas are used in many wireless communication devices, such as mobile phones. A wireless communication device receives/transmits wireless signals having different frequencies, so the presence of a multiband antenna is required. However, many multiband antennas have complicated structures and are large in size, thereby making it difficult to miniaturize the wireless communication devices.

Therefore, there is room for improvement within the art.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
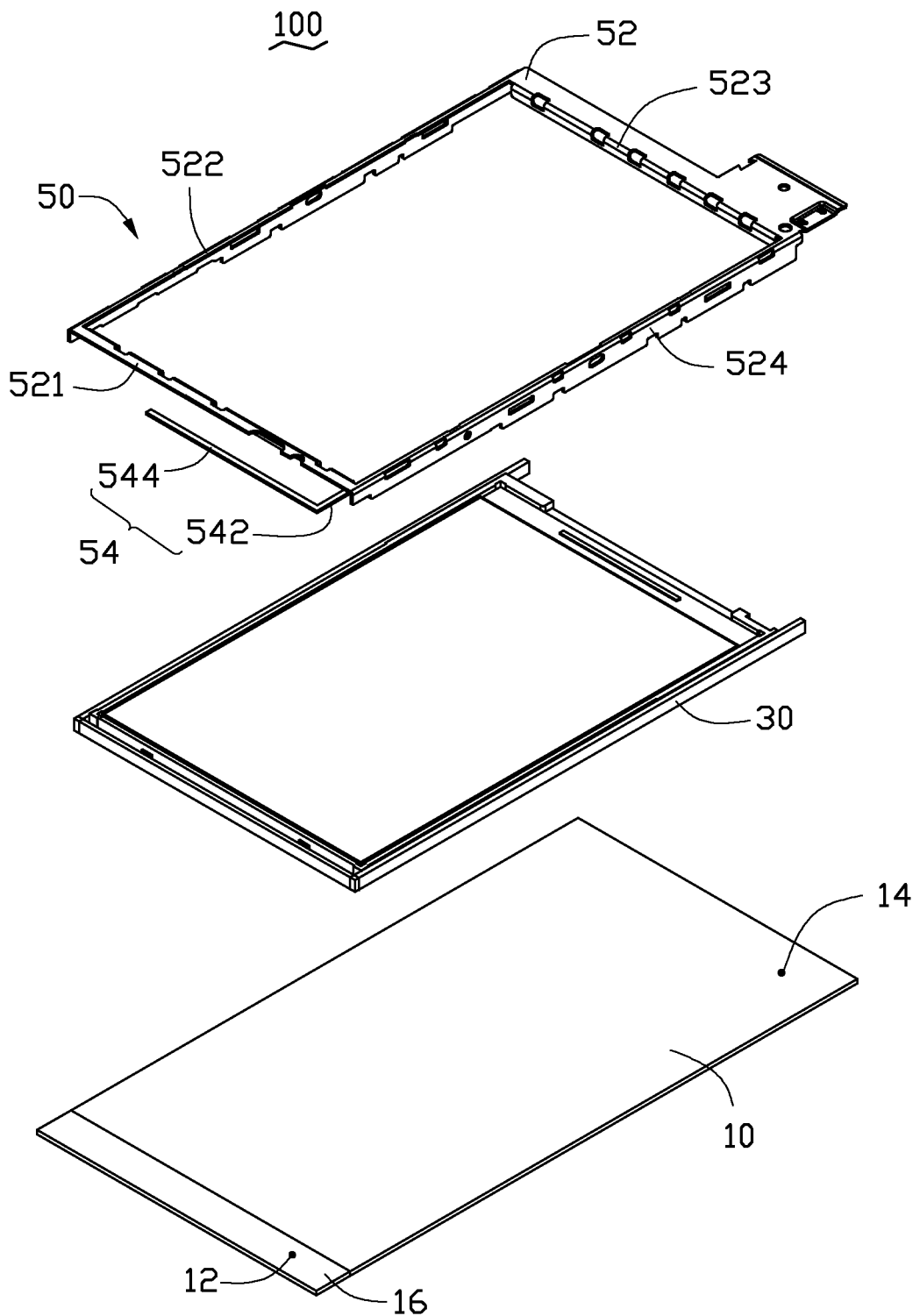
FIG. 1 is an isometric, exploded view of a wireless communication device, according to a first exemplary embodiment.

FIG. 1 is a schematic, isometric view of a wireless communication device 100, according to a first exemplary embodiment. The wireless communication device 100 may be a mobile phone or a personal digital assistant, for example. The wireless communication device 100 includes a base board 10, a display module 30, and a metal member 50. The display module 30 can be a liquid crystal display module (LCM). The metal member 50 surrounds a periphery of the display module 30, and serves as an antenna of the wireless communication device 100. The display module 30 is integrated with the metal member 50 and is located on the base board 10.

In the first exemplary embodiment, the base board 10 is a printed circuit board (PCB) of the wireless communication device 100, and is made of composite materials. A feed pin 12 and a ground pin 14 are disposed on the base board 10. The feed pin 12 is configured to provide current to the antenna, and the ground pin 14 grounds the antenna. The base board 10 is a substantially rectangular board having a keep-out-zone 16. The purpose of keep-out-zone 16 is to not permit other elements (such as a camera, a vibrator, a speaker, etc.) on the base board 10 to be placed in a predetermined area where it may interfere with the antenna. In the first exemplary embodiment, the keep-out-zone 16 is located at an end of the base board 10, and the feed pin 12 is disposed in the keep-out-zone 16.

The metal member 50 includes a frame 52 and a metal body 54 integral with the frame 52. The frame 52 includes a first side 521, a second side 522, a third side 523, and a fourth side 524. The first side 521 and the third side 523 are parallel to each other. The second side 522 and the fourth side 524 are parallel to each other and perpendicularly interconnected between the first side 521 and the third side 523. The frame 52 surrounds the periphery of the display module 30, to secure the display module 30. In addition, the frame 52 is secured to the base board 10 via a screw (not shown), to electronically connect to the ground pin 14. Thus, static electricity from the display module 30 can be grounded.

The metal body 54 extends from the frame 52, and is located spaced above the keep-out-zone 16. In the first exemplary embodiment, the metal body 54 is "L" shaped, and includes a first connecting section 542 and a second connecting section 544. The first connecting section 542 is perpendicularly connected to a junction of the first side 521 and the fourth side 524, and extends away from the fourth side 524. The second connecting section 544 is perpendicularly connected to the first connecting section 542, and extends parallel to the first side 521. Additionally, the first connecting section 542 is electronically connected to the feed pin 12 through an elastic sheet (not shown) or other known processes.

When current is input to the feed pin 12, the metal body 54 receives the current. The current flows from the metal body 54 to the frame 52, and then is grounded by the ground pin 14. Thus, the metal body 54 is activated for receiving and transmitting wireless signals having a first central frequency of about 1575 MHz (GPS signal). Additionally, the metal body 54 is spaced from the display module 30, thereby protecting the metal body 54 from interfering by the display module 30.

Figure 2:
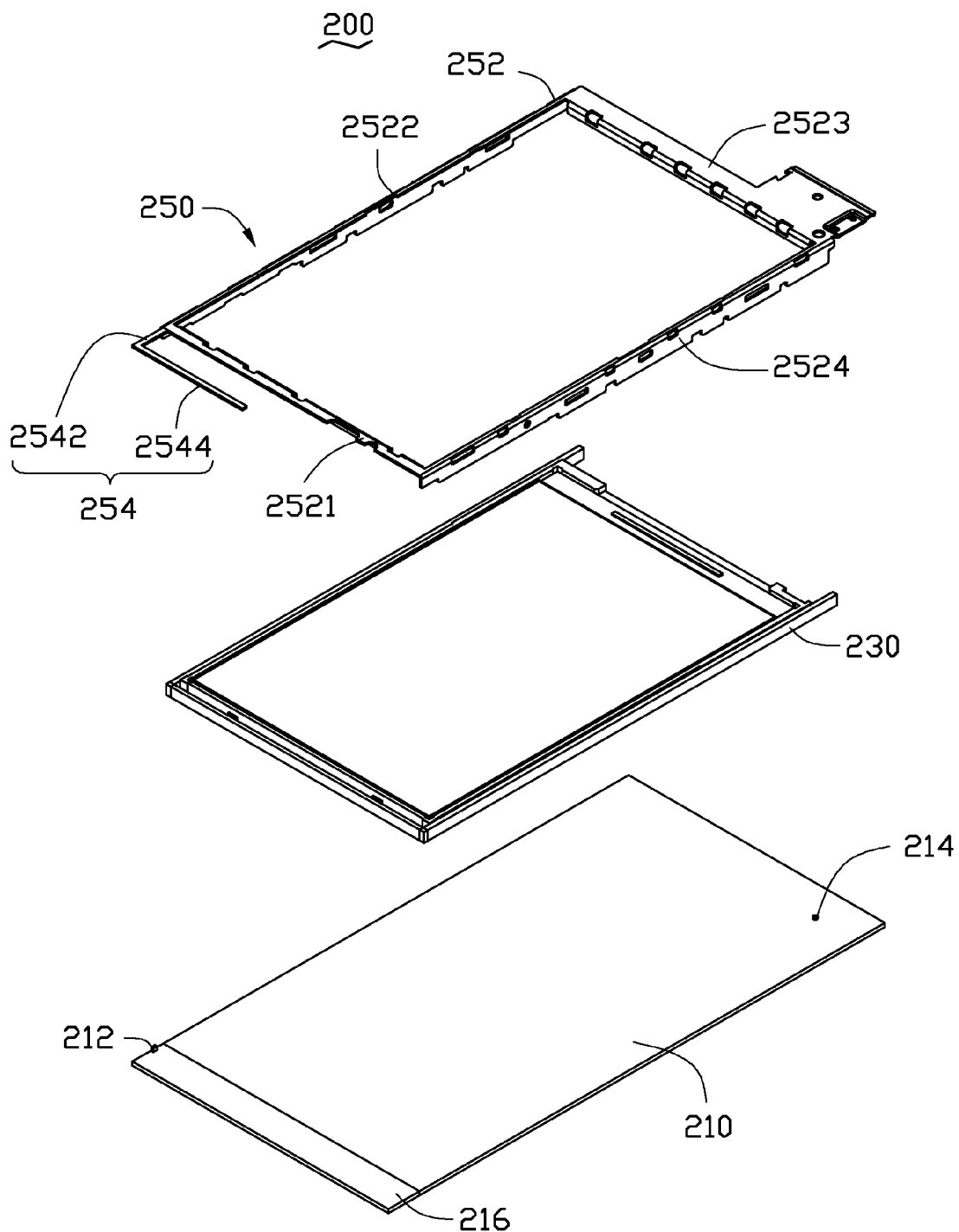
FIG. 2 is an isometric, exploded view of a wireless communication device, according to a second exemplary embodiment.

FIG. 2 is an isometric, exploded view of a wireless communication device 200, according to a second exemplary embodiment. The wireless communication device 200 includes a base board 210, a display module 230, and a metal member 250. The base board 210 includes a feed pin 212 and a ground pin 214, and also defines a keep-out-zone 216. The metal member 250 includes a frame 252 and a metal body 254. The frame 252 includes a first side 2521, a second side 2522, a third side 2523, and a fourth side 2524. In the illustrated embodiment, the metal body 254 includes a first radiation section 2542 and a second radiation section 2544. The first radiation section 2542 is perpendicularly connected to a junction of the first side 2521 and the second side 2522, and extends away from the second side 5222. The second radiation section 2544 is perpendicularly connected to the first radiation section 2542, and extends parallel to the first side 2521. Additionally, the first radiation section 2542 is electronically connected to the feed pin 212. In the embodiment of FIG. 2, the overall length of the metal body 254 is less than the length of the metal body 54. Therefore, the operating frequency of the device 200 is greater than the operating frequency of the device 100.

When current is input to the feed pin 212, the metal body 254 receives the current. The current flows from the metal body 254 to the frame 252, and then is grounded by the ground pin 214. Thus, the metal body 254 is activated for receiving and transmitting wireless signals having a second central frequency of about 2400 MHz (BLUETOOTH signal).

Figure 3:
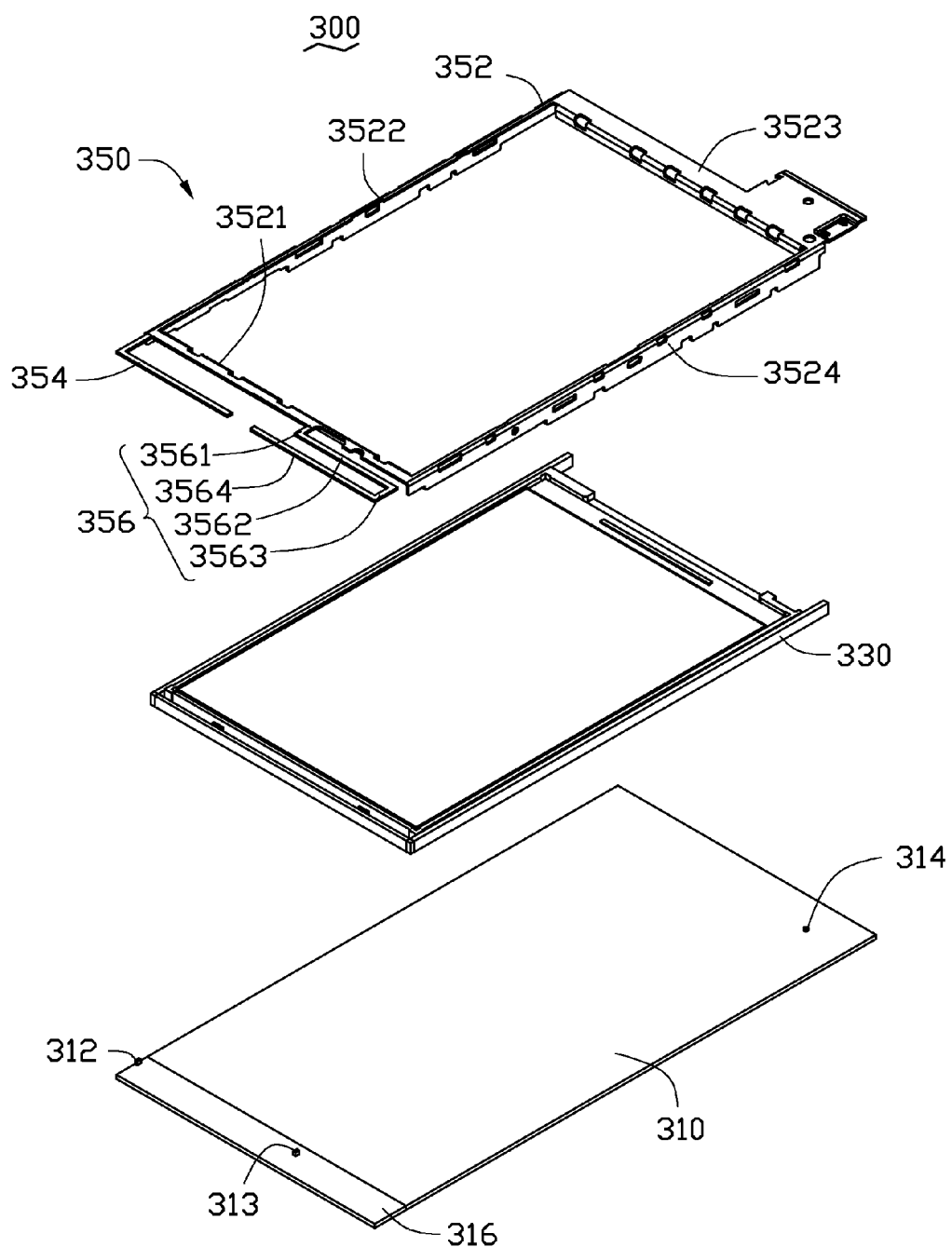
FIG. 3 is an isometric, exploded view of a wireless communication device, according to a third exemplary embodiment.
Figure 4:
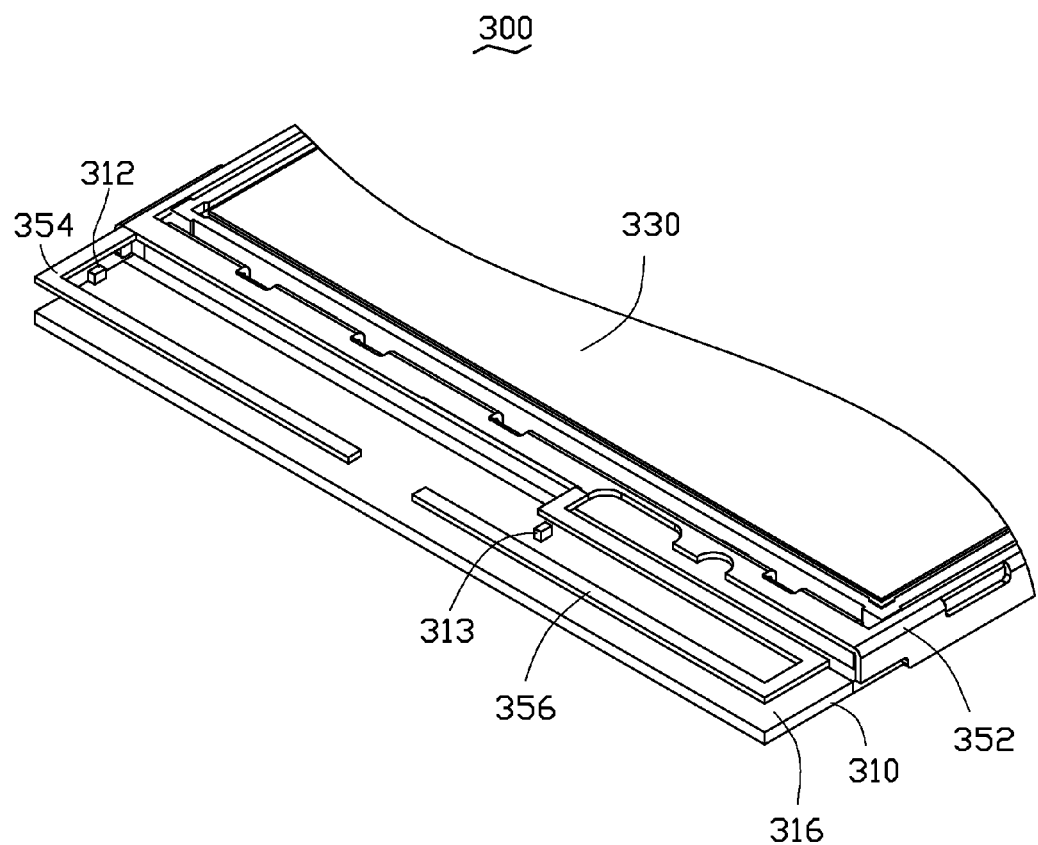
FIG. 4 is an assembled view of the wireless communication device shown in FIG. 3.

FIGS. 3-4 are isometric views of a wireless communication device 300, according to a third exemplary embodiment. The wireless communication device 300 includes a base board 310, a display module 330, and a metal member 350. The base board 310 includes a first feed pin 312, a second feed pin 313, and a ground pin 314, and also defines a keep-out-zone 316. Both the first feed pin 312 and the second feed pin 313 are disposed on the keep-out-zone 316. The metal member 350 includes a frame 352 and a first metal body 354. The frame 352 includes a first side 3521, a second side 3522, a third side 3523, and a fourth side 3524. A structure and a position of the first metal body 354 are same as the metal body 254. In the third exemplary embodiment, the metal member 350 further includes a second metal body 356. The second metal body 356 is located spaced above the keep-out-zone 316, and includes a first extending section 3561, a second extending section 3562, a third extending section 3563, and a fourth extending section 3564. The first extending section 3561 is perpendicularly connected to a middle position of the first side 3521. The second extending section 3562 is perpendicularly connected to the first extending section 3561, and extends parallel to the first side 3521. A distal end of the second extending section 3562 is aligned with the fourth side 3524. The third extending section 3563 is perpendicularly connected to the second extending section 3562, and extends in a direction opposite to the fourth side 3524. The fourth extending section 3564 is perpendicularly connected to the third extending section 3563, and extends parallel to the second extending section 3562 to cross over the second extending section 3562. Additionally, the first extending section 3561 is electronically connected to the second feed pin 313.

Figure 5:
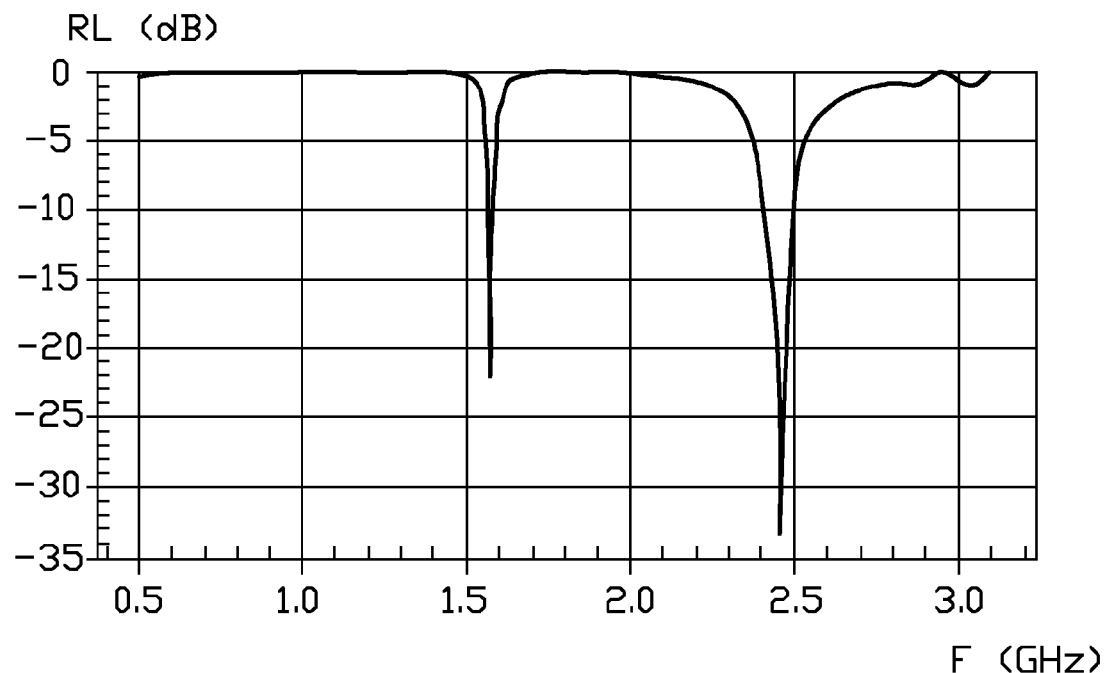
FIG. 5 is a return loss (RL) graph of the wireless communication device shown in FIG. 3.

When current is input to the first feed pin 312 and the second feed pin 313, the first metal body 354, and the second metal body 356 receive the current. A proportion of the current flows from the first metal body 354 to the frame 352, and other proportion of the current flows from the second metal body 356 to the frame 352, and then the current is grounded by the ground pin 314. Thus, the first metal body 354 is activated for receiving and transmitting wireless signals having the second central frequency of about 2400 MHz (BLUETOOTH signal), and the second metal body 356 is activated for receiving and transmitting wireless signals having the first central frequency of about 1575 MHz (GPS signal). FIG. 5 is a return loss (RL) graph of the wireless communication device 300 of FIG. 3. The wireless communication device 300 has good performance when operating at central frequencies of about 1575 MHz and 2400 MHz.

In summary, the metal body 54, 254, 354, and 356 serve as antennas of the wireless communication device. Thus, the wireless communication device does not need to design any other antenna, which can effectively utilize a space of the wireless communication device and costless. In addition, the metal body 54, 254, 354, and 356 extend away from the frame 52, 252, and 352, such that the metal body 54, 254, 354, and 356 are separate and spaced from the display module 30, 230, and 330. Thus, electromagnetic interference between the metal body 54, 254, 354, 356 and the display module 30, 230, 330 is reduced and a radiating capability of the antennas of the wireless communication device is effectively improved.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A wireless communication device, comprising:
a base board comprising a feed pin and a ground pin;
a display module located on the base board; and
a metal member comprising:
a frame electronically connected to the ground pin, and surrounding the display module, the frame comprising a first side, a second side, a third side, and a fourth side, the first side and the third side being parallel to each other, the second side and the fourth side being parallel to each other and perpendicularly interconnected between the first side and the third side; and
one or more metal body extending from the frame and electronically connected to the feed pin, the one or more metal body spaced from the display module to reduce electromagnetic interference between the one or more metal body and the display module;
wherein the one or more metal body comprises a first metal body and a second metal body, the first metal body and the second metal body are outwardly extended from the first side of the frame, the first metal body is connected to a junction of the first side and the second side, the second metal body comprises a first extending section, a second extending section, a third extending section, and a fourth extending section connected in order, the first extending section is perpendicularly connected to a middle position of the first side, a distal end of the second extending section is aligned with the fourth side, the third extending section is perpendicularly connected to the distal end of the second extending section and extends in a direction opposite to the fourth side, the fourth extending section crosses over the second extending section.

2. The wireless communication as claimed in claim 1, wherein the base board defines a keep-out-zone, the metal body is located spaced above the keep-out-zone.

3. The wireless communication as claimed in claim 1, wherein the one or more metal body comprises a first radiation section and a second radiation section, the first radiation section is perpendicularly connected to a junction of the first side and the second side, and extends away from the second side, the second radiation section is perpendicularly connected to the first radiation section, and extends parallel to the first side, the first radiation section is electronically connected to the feed pin.

4. The wireless communication as claimed in claim 1, wherein the second extending section is perpendicularly connected to the first extending section, and extends parallel to the first side, the third extending section is perpendicularly connected to the second extending section, the fourth extending section is perpendicularly connected to the third extending section, and extends parallel to the second extending section.

5. A wireless communication device, comprising:
a base board;
a display module located on the base board; and
a metal member comprising:
a frame surrounding the display module, the frame comprising a first side, a second side, a third side, and a fourth side, the first side and the third side being parallel to each other, the second side and the fourth side being parallel to each other and perpendicularly interconnected between the first side and the third side; and one or more metal body extending from the frame, and separated from the display module to protect the one or more metal body from interfering by the display module;

wherein the one or more metal body, the frame, and the base board cooperatively form at least one current path for allowing the one or more metal body to receive and transmit wireless signals;

wherein the one or more metal body comprises a first metal body and a second metal body, the first metal body and the second metal body are outwardly extended from the first side of the frame, the first metal body is connected to a junction of the first side and the second side, the second metal body comprises a first extending section, a second extending section, a third extending section, and a fourth extending section connected in order, the first extending section is perpendicularly connected to a middle position of the first side, a distal end of the second extending section is aligned with the fourth side, the third extending section is perpendicularly connected to the distal end of the second extending section and extends in a direction opposite to the fourth side, the fourth extending section crosses over the second extending section.

6. The wireless communication as claimed in claim 5, wherein the base board comprises a feed pin and a ground pin, the one or more metal body is electronically connected to the feed pin, and the frame is electronically connected to the ground pin.

7. The wireless communication as claimed in claim 5, wherein the one or more metal body comprises a first radiation section and a second radiation section, the first radiation section is perpendicularly connected to a junction of the first side and the second side, and extends away from the second side, the second radiation section is perpendicularly connected to the first radiation section, and extends parallel to the first side, the first radiation section is electronically connected to the feed pin.

8. The wireless communication as claimed in claim 5, wherein the second extending section is perpendicularly connected to the first extending section, and extends parallel to the first side, the third extending section is perpendicularly connected to the second extending section, the fourth extending section is perpendicularly connected to the third extending section, and extends parallel to the second extending section.

* * * * *